United States Patent [19]

Davis

[11] Patent Number: 5,414,046

[45] Date of Patent: May 9, 1995

[54] FLAME RETARDANT POLYMER COMPOSITIONS COMPRISING THERMALLY STABLE RESINS

[75] Inventor: Gary C. Davis, Albany, N.Y.

[73] Assignee: General Electric Company, Schenectady, N.Y.

[21] Appl. No.: 262,105

[22] Filed: Jun. 17, 1994

[51] Int. Cl.$^6$ .................... C08F 8/00; C08G 63/68
[52] U.S. Cl. .................... 525/132; 528/272; 528/298; 528/299; 528/308; 525/95; 525/97; 525/146; 525/165; 525/178; 525/239; 525/240; 525/420; 525/437
[58] Field of Search ............... 528/272, 298, 299, 308; 525/95, 97, 132, 146, 165, 178, 239, 240, 420, 437

[56] References Cited

U.S. PATENT DOCUMENTS 5,225,115  7/1993  Musselman et al. ............... 252/609
5,292,786  3/1994  Gaggar et al. ...................... 524/127

OTHER PUBLICATIONS

CA 105:192,433.
CA 82:141,037.

*Primary Examiner*—Samuel A. Acquah
*Attorney, Agent, or Firm*—Edward A. Squillante, Jr.; William H. Pittman

[57] ABSTRACT

Novel thermally stable resins comprising halogens and not epoxide termination groups are described. The thermally stable resins may be employed in polymer systems to yield flame retardant polymer compositions.

16 Claims, No Drawings

FLAME RETARDANT POLYMER COMPOSITIONS COMPRISING THERMALLY STABLE RESINS

FIELD OF THE INVENTION

This invention relates to novel thermally stable resins and flame retardant polymer compositions comprising the same. More particularly, the invention is directed to polymer compositions having halogenated resins which do not comprise epoxide termination groups.

BACKGROUND OF THE INVENTION

Thermoplastic resins and blends comprising the same are generally characterized by their many advantageous properties which include optical clarity, high ductility high heat deflection temperatures as well as dimensional stability. As a result of such properties, they are often employed in many commercial applications.

One of the most successful thermoplastics available is the acrylonitrile-butadiene-styrene (ABS) terpolymer. ABS consists of discrete, crosslinked polybutadiene rubber particles which are grafted with poly(styrene-co-acrylonitrile) (SAN) and embedded in a SAN matrix. Interior applications of ABS include instrument panels and knobs while external applications include wheel covers and headlight housings.

It is of increasing interest to prepare thermoplastic resins and blends which, while retaining the above-mentioned advantageous properties, also possess flame retardant properties. Several flame retardant agents have been utilized in an attempt to produce flame retardant thermoplastic resins. For example, alkali metal salts of strong sulfonic acids are commonly used. However, when incorporated into the resin, the resulting polymer is hydrolytically sensitive. Further, when using these salts, it is also necessary to employ drip inhibitors or gas phase flame retardant agents which is not ideal since the former destroys the clarity of the polymer and the latter often creates problems with corrosion and toxicity. As an alternative to the above, phosphorus containing compounds such as triphenylphosphate and brominated compounds such as phenyl ethers have been used. When blended with a base polymer, some flame retardant properties are observed. However, the resulting polymer blends are not desirable since they possess low glass transition temperatures and low impact resistances when compared to the base resin. Additionally, epoxide terminated resins have often been employed in flame retardant compositions. The compositions do, however, display charring and black speck formation after thermal exposure and such charring and black speck formation are believed to be induced by the epoxide termination groups.

Accordingly, the instant invention is directed to novel thermally stable resins and flame retardant polymer compositions comprising the same. Moreover, said thermally stable resins are halogenated and they do not comprise epoxide termination groups.

DESCRIPTION OF THE PRIOR ART

Attempts have been made to prepare thermoplastic resin compositions with flame retardant properties. In commonly assigned U.S. Pat. No. 5,292,786, blends of polycarbonate, ABS, and polyalkylmethacrylate are disclosed, wherein said blends have a phosphate containing flame retardant compound.

Additionally, in U.S. Pat. No. 5,225,115, polymer resins comprising modified hydrocalcite are disclosed and the polymer compounds display enhanced flame retardant properties as well as smoke suppressant properties.

Still other investigators have focused on the production of fire resistant resin compositions. In CA Selects: Flammability 119 (24): 227253j (1993), fire-resistant styrene resin compositions comprising halogenated epoxy resins in which the epoxy groups are partially or completely blocked are described.

The instant invention is patentably distinguishable from the above described since, among other reasons, it is directed to novel thermally stable resins and flame retardant polymer compositions comprising the same, wherein said thermally stable resins are halogenated and do not comprise epoxide termination groups. Moreover, in the instant invention, the flame retardant polymer compositions unexpectedly display a decreased tendency to gel and char during thermal treatment.

SUMMARY OF THE INVENTION

In a first aspect, the instant invention is directed to novel thermally stable polymer resins which do not comprise epoxide termination groups. Said polymer resins are represented by the formula

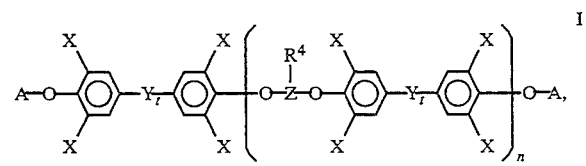

wherein each A is

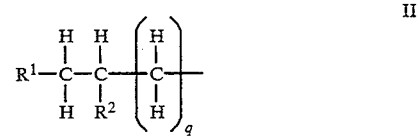

and $R^1$ is hydrogen, a hydroxy group, a $C_{1-5}$ alkoxy group and preferably a methoxy group or a $C_{1-5}$ acyloxy group and preferably an acetoxy group and $R^2$ is a hydrogen, a hydroxy group or a $C_{1-5}$ acyloxy group and preferably an acetoxy group and q is 1 to 4, provided that $R^1$ and $R^2$ are not simultaneously hydrogen. Each Y is independently a bridging radical and often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical and most often $C(R^3)_2$ wherein each $R^3$ is independently a $C_{1-5}$ alkyl and preferably a methyl group. Also included, however, are unsaturated radicals and radicals which contain atoms other than carbon and hydrogen; for example, 2,2-dichloroethylidene, carbonyl, phthalidylidene, oxy, thio, sulfoxy and sulfone. Each t is independently 0 or 1. $R^4$ is a hydroxy group or

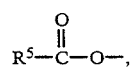

wherein R5 is a $C_{1-5}$ alkyl group and preferably a methyl group, provided that $R^4$ is not a hydroxy group when $R^1$ and $R^2$ are acyloxy groups and X is a halogen and preferably bromine and Z is a $C_{1-5}$ trivalent hydrocarbon radical and preferably $C_3$ trivalent hydrocarbon radical and n is 0 to 100 and preferably 1 to 20.

In a second aspect, the instant invention is directed to flame retardant polymer compositions comprising
  (a) thermally stable polymer resins as depicted by formula I; and
  (b) base polymers.

Illustrative examples of the base polymers that may be employed in the instant invention include polycarbonates, polyesters, acrylics, ABS, arylonitrile-styrene copolymers, polyvinyl chloride, polystyrene, polyethylene, polyphenylene ethers, polyamides and blends prepared therefrom.

As used herein, flame retardant properties mean compositions which are predicted to satisfy UL-94 V-0 requirements for flammability as shown by *Flammability of Plastic Bulletin* published Jan. 24, 1980. Thermally stable resins are defined as those wherein at least about 80% of the resin has not gelled after heat treatment at about 235° C. for about 8 hours.

DETAILED DESCRIPTION OF THE PREFERRED EMBODIMENTS

The thermally stable resins of the instant invention are prepared by subjecting commercially available epoxide terminated resins to, for instance, hydrogen and a palladium catalyst (hydrogenolysis conditions) or acetic acid or an acetic acid and acetic anhydride mix (acidolysis conditions) or a solution of methanol and toluene having a sodium hydroxide or sodium methoxide catalyst (alcoholysis conditions).

The reactions are often run at about ambient temperature and conventionally 5–15 mg of catalyst are employed for every gram of epoxide terminated resin. Typically any inert solvent may be used and often the weight of solvent employed is about 2 to 10 times the weight of epoxide terminated resin.

It is noted herein that there is no limitation with respect to the base polymers that may be employed in the instant invention other than that they are compatible with the thermally stable polymer resins described above. It is often preferred, however, that said base polymers are polycarbonates, ABS terpolymers or blends prepared therefrom as well as polyesters and blends of polycarbonates and polyesters.

The preferred polycarbonates employed in the invention may comprise structural units of the formulae

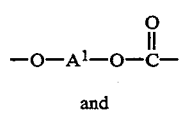

and

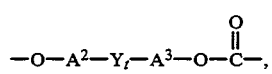

wherein IV is a preferred subgenus of III and $A^1$ is a divalent substituted or unsubstituted aliphatic, alicyclic or aromatic radical, preferably $-A^2-Y_t-A^3-$ wherein $A^2$ and $A^3$ are each independently a monocyclic divalent aromatic radical. Y and t are as previously defined.

The $A^2$ and $A^3$ values may be unsubstituted phenylene or substituted derivatives thereof, illustrative substituents (one or more) being alkyl, alkenyl, alkoxy and the like. Unsubstituted phenylene radicals are preferred. Both $A^2$ and $A^3$ are preferably p-phenylene, although both may be o- or m-phenylene or one o- or m-phenylene and the other p-phenylene.

For reasons of availability and particular suitability for the purposes of this invention, the preferred units of formula IV are 2,2-bis(4-phenylene)propane carbonate units, which are derived from bisphenol A and in which Y is isopropylidene and $A^2$ and $A^3$ are each p-phenylene.

The material represented by formula V

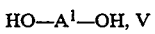 V is the source of structural units of formula III above; $A^1$ is as previously defined.

Illustrative non-limiting examples of V include:
2,2-bis(4-hydroxyphenyl)-propane (bisphenol A);
2,2-bis( 3,5-dibromo-4-hydroxyphenyl)propane;
2,2-bis(3,5-dimethyl-4-hydroxyphenyl)propane;
1,1-bis(4-hydroxyphenyl)cyclohexane;
1,1 -bis(3,5-dimethyl-4-hydroxyphenyl)cyclohexane;
1,1 -bis( 4-hydroxyphenyl)decane;
1,4-his( 4-hydroxyphenyl)propane;
1,1 -bis( 4-hydroxyphenyl)cyclododecane;
1,1 -bis(3,5-dimethyl-4-hydroxyphenyl)cyclododecane;
4,4-dihydroxydiphenyl ether;
4,4-thiodiphenol;
4,4-dihydroxy-3,3-dichlorodiphenyl ether;
4,4-dihydroxy-3,3-dihydroxydiphenyl ether;
1,3 benzenediol; and
1,4-benzenediol.

Other useful dihydroxyaromatic compounds which are also suitable for use in the preparation of the above copolycarbonates are disclosed in U.S. Pat. Nos. 2,999,835; 3,028,365; 3,334,154 and 4,131,575, all of which are incorporated herein by reference. The preferred bisphenol is 2,2-bis(4-hydroxyphenyl)propane (bisphenol A).

The polycarbonates (homopolycarbonates or copolycarbonates) employed in the instant invention may be straight chain or branched as well as graft polymers. They may be prepared, for instance, by reacting bisphenols with a carbonate source such as phosgene or dimethyl carbonate using conventional techniques. These include melt polymerization, intedacial polymerization and interfacial conversion with bischloroformate followed by polymerization. Chain termination agents such as phenol may also be employed.

Precursor monomers that may be polymerized to produce base polymers employed in the instant invention include those represented by the formulae

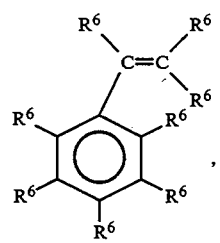

-continued

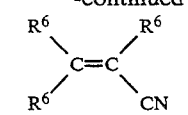

or

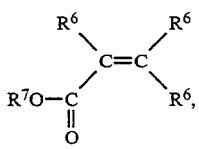

wherein each $R^6$ is independently a hydrogen, lower alkyl ($C_{1-5}$ hydrocarbon), halogen, nitride group (—CN), nitro group (—NO$_2$), sulfonate group (—SO$_3$R$^9$) or ester group

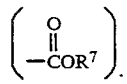

Each $R^7$ is independently a hydrogen or lower alkyl as defined above.

Often, formulae VI, VII and VIII are styrene, acrylonitrile and methyl methacrylate respectively. Moreover, the base polymers described above may employ one or all of the monomers depicted by formulae VI, VII and VIII.

The base polymers of the instant invention may comprise polydiene blocks having structural units represented by the formulae

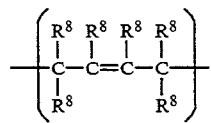

and

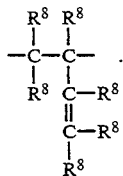

It is often preferred that said polydiene blocks do not compose of more than about 20% by weight of the structural unit represented by formula X based on total weight of the polydiene block. Each $R^8$ is independently a hydrogen, alkyl group, halogen or substituted or unsubstituted aromatic radical.

The preferred ABS terpolymers employed in the instant invention are prepared from precursor monomers represented by formulae VI, VII and polybutadiene latices prepared from polydiene blocks represented by formulae IX and X. They are often prepared by the grafting of styrene and acrylonitrile on a previously formed polybutadiene latex. A possible intermediate in such a method of preparation is a styrene-acrylonitrile copolymer often designated as a SAN copolymer. It is also within the scope of the invention, however, to employ as the ABS resin a blend of a SAN copolymer with a previously formed ABS terpolymer having a relatively high proportion of polydiene units, typically about 40–75% and preferably at least about 50% by weight. In any event, the proportions of combined styrene and acrylonitrile in the ABS terpolymer are most often about 60–90% and preferably about 70–60% by weight based on total weight of the terpolymer.

Proportions of acrylonitrile and styrene taken individually are subject to wide variation, depending on the properties desired in the resinous article. Most often, the styrene comprises about 60–90% by weight of the mixture of the two monomers. Unless special conditions are employed, a styrene-acrylonitrile copolymer generally comprises about 75% styrene and about 25% acrylonitrile structural units irrespective of the monomer proportions in the copolymerization mixture, and those are therefore the proportions most often employed.

The polybutadiene latices mentioned above are prepared via processes that subject, for instance, butadiene to catalysts of the alfin or amylsodium type. More typically, polybutadiene latices are produced by emulsion polymerization techniques that employ an aqueous emulsion of butadiene, an ionic emulsifier and a free radical initiator.

When polycarbonate-ABS blends are employed as the base polymer, there is no limitation with respect to proportions of polycarbonate and ABS in the blend. Polycarbonates often comprise about 70–90% by weight of the total weight of the blend but preferably about 80–85% thereof. Under such conditions, the polycarbonates are usually the continuous phase in the blend and the ABS terpolymers are dispersed therein. No copolymerization between the polycarbonate and ABS terpolymers is conventionally observed; however, copolymerization is not precluded for purposes of the instant invention.

The polyesters employed in the instant invention are typically poly(alkylene dicarboxylates) thus typically of the family consisting of polymeric glycol terephthalates or isophthalates and mixtures thereof including copolyesters of terephthalic and isophthalic acids. The preferred polyester employed in the instant invention is poly(1,4-butylene terephthalate ).

Said polyesters may be prepared, for instance, by reacting a cis- or trans-isomer (or mixture thereof) of 1,4-cyclohexanedimethanol with a mixture of iso- and terephthalic acids. Such preparation is well known in the art and described in detail in U.S. Pat. No. 2,901,466 and commonly assigned U.S. Pat. No. 4,125,571, the disclosures of which are incorporated herein by reference.

Polycarbonate/polyester blends employed in the instant invention can be prepared, for instance, in the melt. When melt mixing, pure polycarbonate and polyester pellets may be added and mixed in a blending vessel at a temperature of about 290° C. in order to obtain the desired blend. The weight ratio of polycarbonate to polyester may vary widely. It may, for example, be from about 99:1 to about 1:99, and is typically from about 90:10 to about 10:90 and preferably from about 75:25 to about 25:75.

The flame retardant polymer compositions of the instant invention are prepared by thoroughly mixing the thermally stable polymer resins and base polymers to produce a dry mixture and subsequently feeding the dry mixture to an extruder operating at barrel set temperatures from about 250° C. to about 350° C. Often, the flame retardant polymer composition of the instant invention comprise from about 0.5 to about 30% by weight of the thermally stable polymer resins but preferably from about 2 to about 15% by weight of the thermally stable polymer resins based on total weight of the composition.

It is further noted herein that conventional additives may be employed in the instant invention including additional flame retardant additives, initiators, inhibitors, stabilizers, plasticizers, pigments, antistatic agents, impact modifiers, fillers, mold release agents and the like.

The following Example and Table provided for hereinbelow are to further illustrate and facilitate the understanding of the present invention.

EXAMPLE

A 22L 3 neck round bottom flask equipped with a mechanical stirrer, reflux condenser and nitrogen tee was charged with 1.0 kg of epoxide terminated polymer resin prepared by reacting an epichlorohydrin with a brominated bisphenol, 5L of methanol and 100 mL of a 25 wt % solution of sodium methoxide in methanol. The contents were stirred and heated at reflux for 24 hours at which time proton magnetic resonance spectroscopy indicated that the reaction was completed. The solvents were removed via filtration and the resulting residue was washed with 3L of dichloromethane and 1L of 1N hydrochloric acid yielding two phases. The phases were separated and the dichloromethane phase was extracted twice with 1L of water. The dichloromethane solution was dried with anhydrous sodium sulfate to subsequently yield 875 g of methanol end-capped thermally stable resin. 80 g of the methanol end-capped thermally stable resin was tumble mixed with 720 g ABS and extruded in a twin screw extruder at 300° C. resulting in a flame retardant polymer composition, as depicted by the requirements for flammability as shown by Flammability of Plastic Bulletin supra.

TABLE

| Entry 1[a] | | Entry 2[b] | |
| --- | --- | --- | --- |
| Time (hrs)[c] | Percent Gel[d] | Time (hrs)[c] | Percent Gel[d] |
| 0 | 0 | 0 | 0 |
| 2 | 45 | 2 | 14 |
| 4 | 100 | 4 | 15 |
| 6 | — | 6 | 15 |
| 8 | — | 8 | 17 |

[a]Control epoxy end-capped polymer resin.
[b]Methanol end-capped thermally stable polymer resin prepared in a manner similar to the one described in the Example.
[c]Time at 235° C.
[d]Percent gelling resulting from resin polymerization.

What is claimed is:
1. A polymer resin having the formula

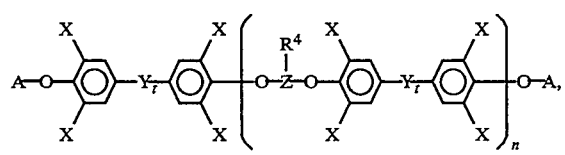

wherein each A is

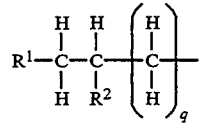

and $R^1$ is hydrogen, a hydroxy group, a $C_{1-5}$ alkoxy group or a $C_{1-5}$ acyloxy group and $R^2$ is hydrogen, a hydroxy group or a $C_{1-5}$ acyloxy group and q is 1 to 4, provided that $R^1$ and $R^2$ are not simultaneously hydrogen and each Y is independently a bridging radical and each t is independently 0 or 1 and $R^4$ is a hydroxy group or

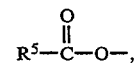

wherein $R^5$ is a $C_{1-5}$ alkyl group, provided that $R^4$ is not a hydroxy group when $R^1$ and $R^2$ are acyloxy groups and X is a halogen and Z is a $C_{1-5}$ trivalent hydrocarbon radical and n is 1 to 100.

2. A polymer resin in accordance with claim 1 wherein X is bromine, n is 1 to 20 and each Y is independently a $C(R^3)_2$ bridging radical wherein each $R^3$ is independently a $C_{1-5}$ alkyl group.

3. A polymer composition comprising:
(a) a polymer resin having the formula

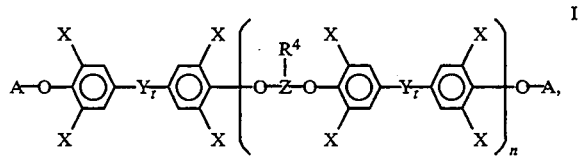

wherein each A is represented by structural units of the formulae

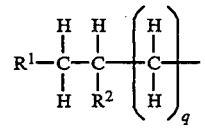

and $R^1$ is hydrogen, a hydroxy group, a $C_{1-5}$ alkoxy group or a $C_{1-5}$ acyloxy group and $R^2$ is hydrogen, a hydroxy group or a $C_{1-5}$ acyloxy group and q is 1 to 4, provided that $R^1$ and $R^2$ are not simultaneously hydrogen and each Y is independently a bridging radical and each t is independently 0 or 1 and $R^4$ is a hydroxy group or

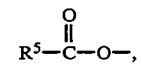

wherein $R^5$ is a $C_{1-5}$ alkyl group, provided that $R^4$ is not a hydroxy group when $R^1$ and $R^2$ are acyloxy groups and X is a halogen and Z is a $C_{1-5}$ trivalent hydrocarbon radical and n is 0 to 100; and
(b) base polymers.

4. A polymer composition in accordance with claim 3 wherein X is bromine, n is 1 to 20 and each Y is independently a $C(R^3)_2$ bridging radical wherein each $R^3$ is independently a $C_{1-5}$ alkyl group.

5. A polymer composition in accordance with claim 3 wherein said base polymers are polycarbonates, polyesters, an acrylic, acrylonitrile-butadiene-styrene terpolymers, acrylonitrile-styrene copolymers, polyvinyl chlorides, polystyrenes, polyethylenes, polyphenylene ethers, polyamides or blends prepared therefrom.

6. A polymer composition in accordance with claim 5 wherein said base polymers are blends of acrylonitrile-butadienestyrene and polycarbonates.

7. A polymer composition in accordance with claim 5 wherein said base polymers are blends of polyesters and polycarbonates.

8. A polymer composition in accordance with claim 5 wherein said polycarbonates comprise structural units of the formula $$-O-A^1-O-\overset{O}{\underset{\|}{C}}-,$$

and $A^1$ is a divalent substituted or unsubstituted aliphatic, alicyclic or aromatic radical.

9. A polymer composition in accordance with claim 8 wherein $A^1$ is $A^2-Y_t-A^3$ and $A^2$ and $A^3$ are each independently a monocyclic divalent aromatic radical and Y is a bridging radical and t is 0 to 4.

10. A polymer composition in accordance with claim 9 wherein said polycarbonate is a bisphenol A polycarbonate.

11. A polymer composition in accordance with claim 5 wherein said base polymers are prepared from precursor monomers having the formulae $$\underset{R^6}{\overset{R^6}{\diagdown}}C=C\underset{\underset{R^6}{\diagup}}{\overset{R^6}{\diagup}}\!\!\!\!\!\!\!\bigcirc\!\!\!\!\!\!\!\underset{R^6}{\overset{R^6}{\diagdown}} \quad \text{VI}$$

$$\underset{R^6}{\overset{R^6}{\diagdown}}C=C\underset{CN}{\overset{R^6}{\diagup}} \quad \text{VII}$$

or $$\underset{R^7O-\underset{\|}{\underset{O}{C}}}{\overset{R^6}{\diagdown}}C=C\underset{R^6}{\overset{R^6}{\diagup}}, \quad \text{VIII}$$

wherein each $R^6$ is independently a hydrogen, $C_{1-5}$ alkyl group, halogen, nitrile group, nitro group, sulfonate group ($-SO_3R^7$) or ester group $$\left(-\overset{O}{\underset{\|}{C}}OR^7\right)$$

and each $R^7$ is independently a hydrogen or $C_{1-5}$ alkyl group.

12. A polymer composition in accordance with claim 5 wherein said base polymers are prepared from precursor monomers represented by formulae VII and VIII and comprise polydiene blocks prepared from structural units of the formulae $$\left(\begin{array}{cccc} R^8 & R^8 & R^8 & R^8 \\ | & | & | & | \\ -C-C=C-C- \\ | & & & | \\ R^8 & & & R^8 \end{array}\right) \quad \text{IX}$$

and $$\begin{array}{c} R^8 \ R^8 \\ | \ \ | \\ -C-C- \\ | \ \ | \\ R^8 \ C-R^8 \\ \ \ \ \| \\ \ \ \ C-R^8 \\ \ \ \ | \\ \ \ \ R^8 \end{array} \quad \text{X}$$

wherein each $R^8$ is independently a hydrogen, alkyl group, halogen or substituted or unsubstituted aromatic radical, provided that said polydiene blocks do not comprise of more than 20% by weight of formula XI based on total weight of the polydiene block.

13. A polymer composition in accordance with claim 5 wherein said polyester is a poly(alkylene dicarboxylate).

14. A polymer composition in accordance with claim 11 wherein said poly(alkylene dicarboxylate) is poly(1,4-butylene terephthalate).

15. A polymer composition in accordance with claim 3 wherein said composition comprises from about 0.5 to about 30% by weight of said polymer resin based on total weight of the composition.

16. A polymer composition in accordance with claim 3 wherein said composition comprises from about 2 to about 15% by weight of said polymer resin based on total weight of the composition.

* * * * *